June 1, 1937.  A. A. G. MAGIS  2,082,584
TUBE COUPLING AND METHOD OF MAKING SAME
Filed Feb. 29, 1936  2 Sheets-Sheet 2
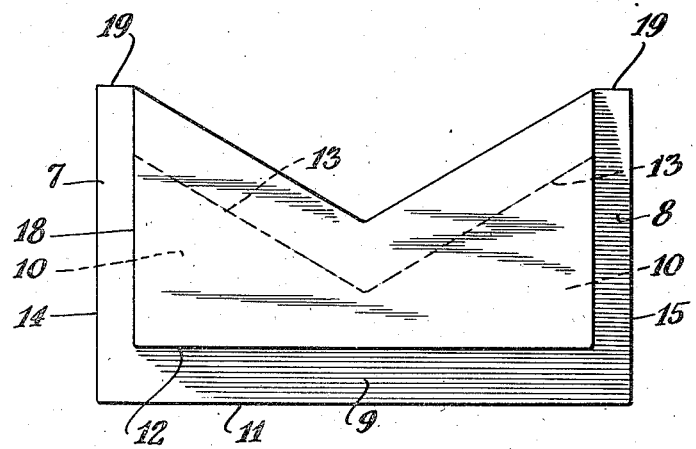
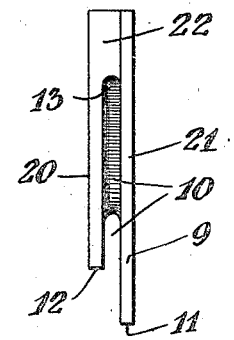
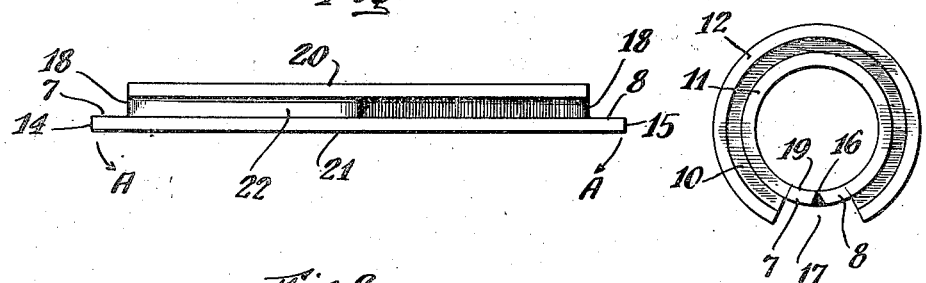
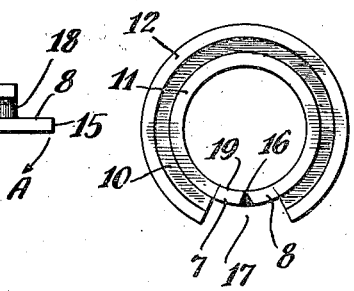
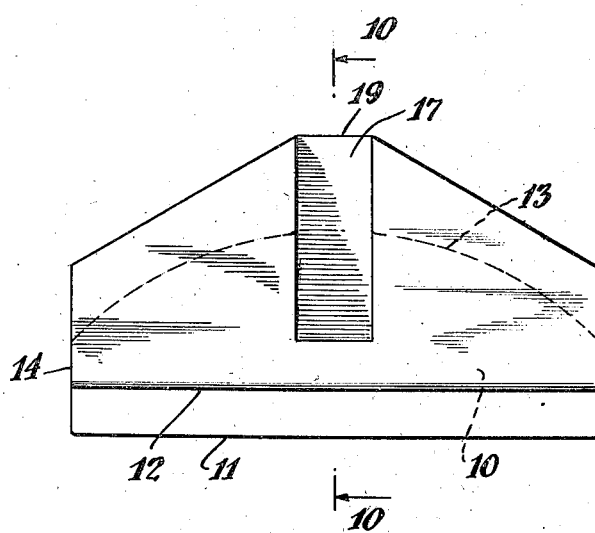
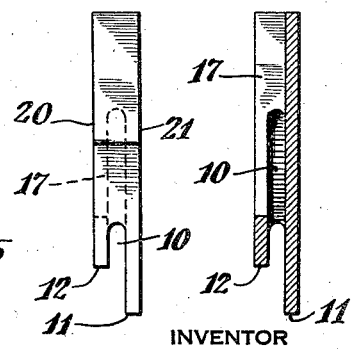
INVENTOR
AUGUSTE A. G. MAGIS
BY
ATTORNEY Patented June 1, 1937

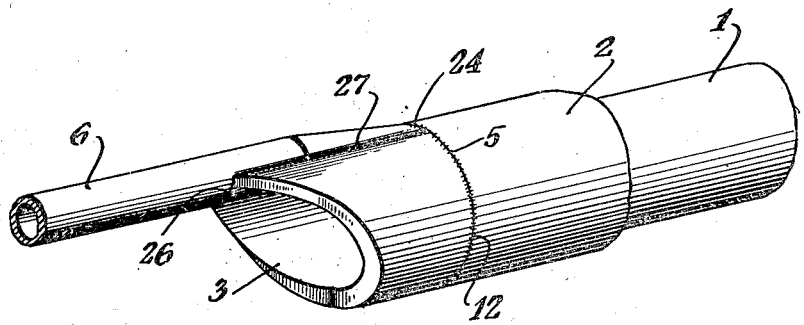
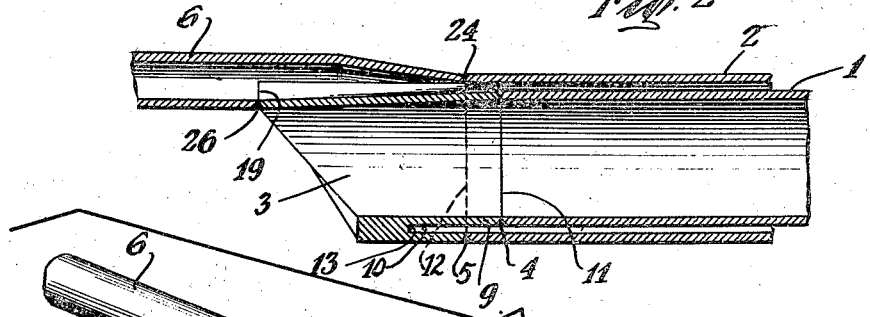
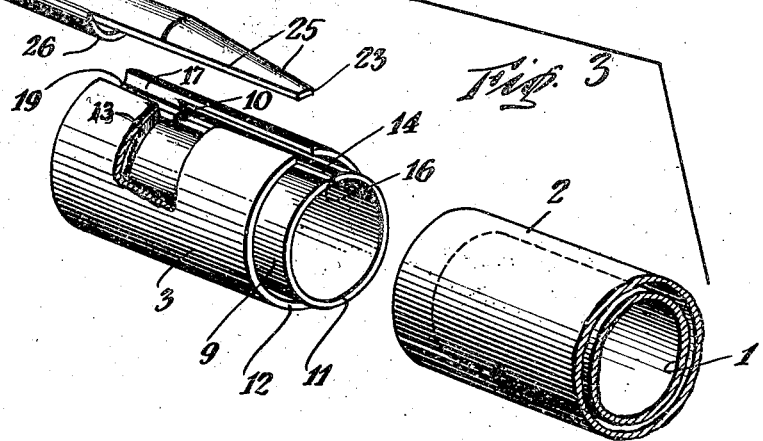

2,082,584

UNITED STATES PATENT OFFICE 2,082,584

TUBE COUPLING AND METHOD OF MAKING SAME

Auguste A. G. Magis, Paris, France, assignor to The Superheater Company, New York, N. Y.

Application February 29, 1936, Serial No. 66,391
In France March 11, 1935

13 Claims. (Cl. 29—157.4)

This invention relates to tubular fluid circulating elements for superheaters or the like.

It happens frequently in various industries, particularly in connection with heat exchangers, that two concentric tubes have to be connected one to the other at one of their ends, or that the end one of these tubes is to be wholly or partly closed on that of the other tube, so as to close one end of the annular space which forms a fluid passage therebetween. This occurs, for example, in connection with annular superheater elements adapted to be disposed in boiler flues and in which the fluid to be superheated flows through the annular space and from one end thereof into one or several non-concentric tubes.

The part which fatigues soonest in these annular elements is evidently the junction point of the two tubes since it is located at the fire-box end of the flue and is exposed to very hot gases and at the same time to the differential expansion stresses and, in addition, to the erosion caused by the cinders striking it with considerable velocity. It is therefore important to form at this point a reinforcement which the processes used at the present time do not furnish unless one resorts to welding or forging. Processes involving hammering result in the metal at this point actually becoming thinner and therefore result in an inferior product.

The present invention has for its object the provision of a process for assembling such tubes which is simple to carry out and which does not in principle involve the deformation of the ends of the concentric tubes. It consists essentially in the preparation of a coupling member from a flat blank by operating on a sheet or plate to adapt it for coupling the annular passage between the concentric tube to the interior of the non-concentric tube. The treated blank is then shaped to form a hollow crown which is then welded to the tubes, due care being taken to chamfer the edges of the plate which are to lie adjacent to the tube ends.

The invention likewise relates to a new industrial article consisting of a connecting cap or crown for concentric tubes having the following characteristics; the line in the cap crown along which the small or interior concentric tube is to be joined projects beyond the line at which the corresponding outer tube is joined so that the interior tube can easily be welded first without interference from the part of the crown to which the outer tube is to be connected, after which the latter is welded on. The thickness of the cap at the point where the inner and outer walls meet is greater than that of the tubes; finally the crown is made out of a single flat blank comprising two plane surfaced sections joined to each other by a thicker part which is given an arched shape in forming the cap or annular crown.

In order to make clear how the invention may be carried out, there will be described below with reference to the accompanying drawings the process of fabricating the crown for coupling an annular superheater element to an eccentric outlet tube.

Figs. 1 and 2 represent in perspective and in longitudinal section, respectively, a superheater element assembly made in accordance with one method of carrying out the invention;

Fig. 3 is an exploded perspective view showing the arrangement of the parts before they are joined;

Figs. 4, 5 and 6 are plan, front edge and side edge views of a blank from which the hollow crown is formed in accordance with the invention;

Fig. 7 is a front end view of the hollow crown formed by welding the side edges of the blank together; and Figs. 8, 9 and 10 are plan, side and sectional views of another blank fabricated according to a variation in the process.

In Figs. 1 to 3, the numeral 1 represents the inner tube, 2 the outer tube, 3 the hollow crown which connects them by means of welds at 4 and 5; 6 is a tube for the exit of steam connected to the end and outside of the crown by welding its extremity, suitably cut, into a groove formed in the exterior wall of the hollow crown.

Figs. 4 to 6 refer to a blank for forming a crown of the type employed in Figs. 1 and 2. The blank shown in Figs. 4 to 6 may be fabricated from a sheet or plate of uniform thickness, this dimension of the blank being equal to the sum of the wall thicknesses of the inner and outer concentric tubes plus the radial extent of the annular passage therebetween, or, in other words, to half the difference between the interior diameter of tube 1 and the external diameter of tube 2. In carrying out the invention, the length of the blank along its longitudinal edge is substantially equal to the external circumference of the inner tube 1; the side dimension of the blank may vary in accordance with the axial length of the crown which it is desired to form. A slot 10 is cut in and along the longitudinal edge of the blank, the slot being cut in such manner that the remaining edge portions 11, 12 equal the thicknesses of the tubes 1 and 2, respectively;

these thicknesses may be the same. The slot is cut to a depth such that the wall thickness of the blank separating the bottom 13 of the slot from the rear edge of the blank is greater at all points than the thickness of the thicker of the two tubes 1 and 2. The bottom wall 13 of slot 10 is preferably parallel to the rear longitudinal edge of the blank. In Figure 4 the rear longitudinal edge of the blank is shown as V-shaped or convergent towards the middle of the blank, and the bottom 13 of slot 10 parallels the rear edge of the blank so that the slot varies in depth, being of greatest depth adjacent the side edges of the blank. The bottom wall of the slot 10 is preferably rounded to provide increased strength and avoid rupture.

The blank is then cut away along its longitudinal edge and both side edges to provide flanges 7, 8, 9 therealong of a thickness corresponding to the wall thickness of the tube 1 and having their upper faces aligned with, or in the plane of, one side wall of the slot 10, and constituting extensions thereof. Slotting the blank in the manner described results in forming two plane surfaced members or plates 20, 21 joined along their rear edges by the body 22 of the plate, parallelly spaced with respect to each other and separated by a slot corresponding in width to the radial extent of the annular passage between the tubes 1 and 2.

After slotting and flanging the blank as described above, it is bent about its transverse axis in the direction of the arrows A and shaped to form a hollow crown having a cross-sectional shape corresponding to that of the tubes 1 and 2, by abutting the side edges 14, 15 of the flanges 7, 8, which are then welded together as indicated at 16, Figs. 3 and 7. A strip of metal such as copper of suitable thickness may be placed in the slot between the lips 11 and 12 to prevent their being jammed together as a consequence of their tendency to assume the same radial position.

When the blank is shaped as mentioned, the longitudinal edge portions 11, 12, thereof, are formed into concentric lips adapted to be joined respectively to the ends of the inner and outer tubes 1, 2. The upper surfaces of flanges 7, 8, along the side edges of the blank become the base of a groove 17, Figs. 3 and 7, extending longitudinally of the crown from its rear end face and the adjacent body portions 18 of the blank along its sides constitute the side walls of this groove. Due to the fact that the blank was cut away to a depth such that the top surfaces of the flanges 7, 8 align with the side wall of the slot 10 cut in its longitudinal edge, the groove formed by these portions of the blank is in communication with the pocket formed by the slot 10 and defined by the lip portions of the crown. This pocket is adapted to constitute an extension of the annular passage between the tubes 1 and 2.

The flange 9 formed along the longitudinal edge of the blank causes the inner concentric lip which is adapted to be joined to the smaller tube 1 to project beyond the end face of the outer lip which is adapted to be joined to the larger tube 2 by a weld joint 5, Fig. 2. This facilitates welding the crown to the tubes, since the tube 1 may be welded first at 4 and then the tube 2 at 5.

The end portion of the non-concentric tube 6 is cut away longitudinally of its underside producing an arcuate portion 23, adapted to be joined by a weld 24, to the end of the larger tube 2 when the end portion of the eccentric tube is laid in the longitudinal groove 17 in the hollow crown. The resulting longitudinal edge portions 25 on the pipe 6 are welded at 27 to the crown 3 along the side walls of groove 17 and the end face portion 26 of the tube 6 is joined to the rear end face 19 of the bottom wall of the groove 17 in crown 3. In making this last joint it may be desirable to deform either the portion 19 of the crown or the portion 26 of the tube 6 so that these end faces have a like curvature and meet.

The blank shown in Figs. 8 to 10 is formed in quite similar manner except that the bottom of the slot cut in the longitudinal edge of the blank is formed along an arc. In this form the side edges of the blank are not flanged to form groove parts but the blank is cut away centrally between its side edges to a depth placing the resulting groove 17 in communication with the slot 10. To form the hollow crown from this blank its side edges are abutted and joined as in the case of the blank of Figs. 4 to 6, and groove 17 becomes adapted to receive the end portion of the tube 6.

Although mention has been made of slotting, grooving, and forming flanges on, a blank it is to be understood that the processed blank may be produced in other ways. For example, a substantially rectangular plate might be bent upon itself in elongated U-shape to form the parallelly disposed plane surfaced members 20, 21. The longitudinal and side flanges 9, 7, 8 might then be formed by cutting away the longitudinal and/or side edges of one leg of the U-shaped blank. Instead of flanging the side edges to provide parts to form grooves 17 the central portion of one leg of the U-shaped blank might be cut away transversely thereof. Following this method, with its alternatives, the hollow crown would then be formed by abutting and joining the side edges of the U-shaped blank in the manner previously described.

The hollow crown with its pocket and groove might also be formed by cutting a slot inwardly from one end face of an annulus of appropriate thickness; the groove 17 for tube 6 being formed by slotting axially along the exterior wall of the annulus to the depth of the pocket-forming slot.

The rear edge of the blanks from which the crowns are formed need not necessarily be convergent toward the mid-portion thereof or divergent therefrom as shown in Figs. 4 and 8 respectively. It may be of any other shape. Especially it may be straight or parallel to the forward edge to constitute an annular crown having a rear end face that is straight; or sinusoidal to form an end on the bias or on the diagonal. The form shown in the drawings has an end which approaches the bias.

However, an advantage of forming the rear edge of the blank as shown in Figs. 4 and 8 is that when a crown is formed the rear end of the latter is inclined upwardly and rearwardly so that the lower portion thereof which is exposed to the hot gases is further forward in the flue than would be the case if the blank had a straight rear end portion and thus the crown is better protected against overheating and burning by gases. Likewise the shaping of the bottom wall of the slot 10 as shown in Figs. 4 and 8 results in the pocket in the crown having its greatest depth or axial extent adjacent the upper portion of the crown where the tube 6 is fitted into the groove 17. Consequently, a "dead space" or pocket is avoided as steam flows from the annular space between the tubes 1 and 2 through the crown pocket to the interior of the tube 6.

Although specific embodiments of the hollow, tube-coupling, crown of the invention have been described in detail herein there are many variations and changes which can be made without departing from the invention. It will also be understood that modifications may be made in the mechanical processes for machining and forming the crown and for assembling the parts without departing from the spirit of the invention, and particularly that the sequence in which the steps of the processes are carried out may be changed.

What I claim is:

1. A coupling member for closing one end of the annular passage between a pair of concentric tubes and connecting said passage to the interior of another non-concentric tube comprising; a hollow, cylindrical crown formed at one end with inner and outer concentric lips spaced to define an annular pocket extending inwardly from one end face of the crown and communicating with a groove in the exterior wall of said crown that extends longitudinally thereof from its other end face, said lips being adapted to be aligned with and joined to the ends of the concentric tubes so that said pocket constitutes an extension of the annular passage between said tubes and said groove in said crown being adapted to receive an end portion of the non-concentric tube which is cut away at said end to place it in communication with said pocket and joined to said crown.

2. In a superheater element or the like; a pair of concentric, metallic tubes providing an annular fluid passage therebetween; a coupling member for closing said passage at one end thereof comprising; a hollow, cylindrical metallic crown formed at one end with inner and outer concentric lips spaced to define an annular pocket extending inwardly from one end face of the crown and communicating with a groove cut in the exterior wall of said crown and extending longitudinally thereof from its other end face; weld joints connecting the outer and inner lips on said crown to the larger and smaller concentric tubes, respectively, with the pocket in said crown aligned with the annular passage between said tubes to constitute an extension thereof.

3. In a superheater element or the like; a pair of concentric metallic tubes providing an annular fluid passage therebetween; a coupling member for closing said passage at one end thereof and placing it in communication with the interior of another non-concentric tube comprising; a hollow, cylindrical, metallic crown formed at one end with inner and outer concentric lips spaced to define an annular pocket extending inwardly form one end face of the crown and communicating with a groove cut in the exterior wall of said crown and extending longitudinally thereof from its other end face; weld joints connecting the outer and inner lips on said crown to the larger and smaller concentric tubes, respectively, with the pocket in said crown aligned with the annular passage between said tubes to constitute an extension thereof, said groove being adapted to receive an end portion of another tube that is disposed therein with its longitudinal axis eccentric with respect to that of said concentric tubes and which is cut away at said end portion to place its interior in communication with the pocket in said crown; and weld joints between said crown and said end portion of said other tube.

4. A superheater element as recited in claim 2 wherein the inner lip on said crown projects beyond the outer lip thereof, and the end of the larger of said concentric tubes which is joined to said outer lip extends beyond the end of the smaller tube which is joined to the inner lip on said crown.

5. In a superheater element or the like; a pair of concentric metallic tubes providing an annular fluid passage therebetween; a coupling member for closing said passage at one end thereof and placing it in communication with the interior of another non-concentric tube comprising; a hollow, cylindrical, metallic crown formed at one end with inner and outer concentric lips spaced to define an annular pocket extending inwardly from one end face of the crown and communicating with a groove cut in the exterior wall of said crown and extending longitudinally thereof from its other end face; weld joints connecting the outer and inner lips on said crown to the larger and smaller concentric tubes, respectively, with the pocket in said crown aligned with the annular passage between said tubes to constitute an extension thereof; a tube disposed in said groove with its longitudinal axis eccentric with respect to that of said concentric tubes; a weld joint connecting an arcuate portion at the forward end of said tube, adjacent the lip end of said crown, to the end of the larger of said concentric tubes, the tube in said groove being cut away longitudinally of its underside from the limits of said arcuate end portion thereof for placing its interior in communication with said pocket in said crown; and weld joints connecting the longitudinal edges and arcuate end face portion adjacent the rear end of said cut-away portion, which are formed by cutting away its underside at its forward end, to the side walls of the groove in said crown and to the rear end face of the latter, respectively.

6. The method of making a coupling member for closing one end of the annular passage between a pair of concentric tubes which comprises; forming a slot in and extending along one longitudinal edge of a metallic blank having a thickness substantially equal to the sum of the wall thicknesses of said tubes and the radial spacing thereof and having a length equal to the external circumference of the inner one of said concentric tubes; shaping said blank into a hollow crown having a cross-sectional shape conforming to that of said tubes by bending it about its transverse axis to abut its side edges to form the portions of said longitudinal edge of said blank adjacent said slot into concentric lips adapted to be joined to the ends of said concentric tubes and to form said slot into an annular pocket defined by said lips and adapted to constitute an extension of the annular passage between the concentric tubes; and joining the abutted side edges of said blank.

7. In the method as recited in claim 6 the step of forming a flange along said longitudinal edge of the blank at one side of said slot so that the lip formed from said flange, when the blank is shaped into a hollow crown, and which is adapted to be joined to the larger of the concentric tubes projects beyond the lip that is adapted to be joined to the smaller concentric tube.

8. In the method recited in claim 6, the step of forming a longitudinal groove in the exterior wall of said crown to a depth placing it in communication with said pocket therein for receiving the end portion of another non-concentrically disposed tube to place it in communication through said crown groove and pocket with the annular passage between the concentric tubes.

9. The method of making a coupling member for closing one end of the annular passage between a pair of concentric tubes and for placing said passage in communication with the interior of another tube disposed with its longitudinal axis eccentric with respect to that of said tubes which comprises; forming flanges, of a thickness equalling the wall thickness of the smaller concentric tube, along the side edges of a blank having a longitudinal edge equal in length to the external circumference of said smaller tube and having a thickness equal to the sum of the wall thicknesses of said concentric tubes and the radial spacing thereof; cutting a slot in and along the longitudinal edge of said blank with one wall of said slot aligned with the upper faces of said flanges; shaping said blank into a hollow crown having a cross-sectional shape conforming to that of said concentric tubes by bending it about its transverse axis to abut the edges of the flanges on its side edges for forming the longitudinal edge portions of said blank adjacent said slot into concentric lips adapted to be joined to the ends of said concentric tubes, for forming said slot into an annular pocket defined by said lips and adapted to constitute an extension of the annular passage between the concentric tubes, and for forming the flanges on the side edges of said slot and the adjacent body portion of the blank into a groove extending longitudinally of said crown in communication with said pocket and adapted to receive the end portion of the non-concentric tube.

10. In the method recited in claim 6, the step of forming a slot extending transversely of said blank centrally of its side edges to a depth placing it in communication with the pocket-forming slot in its longitudinal edge, said transverse slot being adapted when said blank is bent to crown shape to constitute a groove for receiving the end portion of another tube adapted to be placed in communication with the annular passage between the concentric tubes through the intermediary of the groove and pocket formed in said crown.

11. The method of making a coupling member for closing one end of the annular passage between a pair of concentric tubes which comprises; bending a blank, consisting of plane-surfaced, substantially rectangular members that are joined along their rear longitudinal edges and parallelly spaced to provide a slot therebetween that extends inwardly from their forward longitudinal edges, into the form of a hollow crown by abutting and joining its side edges so that the forward longitudinal edge portions of said blank adjacent said slot constitute concentric lips adapted to be joined to the ends of the pair of concentric tubes and the slot therebetween constitutes a pocket adapted to form an extension of the annular passage between the concentric tubes.

12. The method of making a coupling member for closing one end of the annular passage between a pair of concentric tubes and for placing said passage in communication with the interior of another tube disposed with its longitudinal axis eccentric with respect to that of said tubes which comprises; forming an annular pocket, having a width substantially equal to the radial extent of the annular passage between the concentric tubes, in one end face of a hollow crown conforming in cross-sectional shape to the concentric tubes; and forming a longitudinal groove in the exterior wall of said crown extending inwardly from the other end face thereof to a depth placing it in communication with said pocket.

13. In the method recited in claim 6 the step of forming the slot in the longitudinal edge in said blank of varying depth inwardly from the said edge of the blank and so that the pocket created in shaping the crown is upwardly and rearwardly inclined in the crown and is of greatest depth, or axial extent, adjacent the groove for receiving said non-eccentric tube.

AUGUSTE A. G. MAGIS.